UNITED STATES PATENT OFFICE.

ALEXANDRE DE PONT AND SILVIUS DE PONT, OF PARIS, FRANCE, ASSIGNORS OF TWO-THIRDS TO HERBERT LUSHINGTON STOREY AND ISAAC HENRY STOREY, BOTH OF LANCASTER, ENGLAND.

PROCESS OF MANUFACTURING ARTIFICIAL IVORY.

SPECIFICATION forming part of Letters Patent No. 414,775, dated January 13, 1891.

Application filed November 5, 1889. Serial No. 329,374. (No specimens.) Patented in England June 4, 1889, No. 9,267.

*To all whom it may concern:*

Be it known that we, ALEXANDRE DE PONT and SILVIUS DE PONT, citizens of Switzerland, and residents of Paris, France, temporarily residing at Lancaster, in the county of Lancaster, England, have invented certain new and useful Improvements in the Process of Manufacturing Artificial Ivory or Ivory Substitutes, (for which we have applied for Letters Patent in Great Britain, No. 9,267, bearing date June 4, 1889,) of which the following is a specification.

The invention relates to a new or improved method by which we can construct artificially an ivory having the same properties, component parts, and appearance as the natural product.

Hitherto inventions for the manufacture of substitutes for ivory have been based upon the solidification of animal or vegetable substances with agglutinants or upon subjecting such substances to heat in order to render them plastic and capable of being compressed or molded into the required shape. The results of these different methods, however, have not proved very satisfactory.

The object of our invention is to produce or build up ivory synthetically of the elements or materials which on analysis are found to constitute the natural ivory, of which a careful chemical analysis gives the following constituents: tribasic phosphate of lime, carbonate of lime, magnesia, alumina, gelatine, and albumen.

The invention consists, essentially, in forming or constructing an artificial ivory having the same physical properties and of the same chemical constituents as natural ivory by chemically combining the latter together under a great pressure and at a high temperature.

In carrying out the invention we procure or prepare in as pure a form as possible each of the above-mentioned materials in the required proportions. The solid bodies, either by mechanical means or by precipitation, are reduced to a very fine state of subdivision. We first treat caustic lime (CaO) with water sufficiently to hydrate it, and before the hydration is completed and while the lime still remains caustic or retains some of its causticity we carefully pour over it an aqueous solution of phosphoric acid ($H_3PO_4$) and mix the two well together for the purpose of forming phosphate of lime. During this mixing there is added gradually a small quantity each of carbonate of lime, ($CaCO_3$,) magnesia, (MgO,) and alumina, ($Al_2O_3$,) and then an admixture of gelatine and albumen (dissolved together in water) or their chemical equivalents, such as fibrine, caseine, or vegetable fibrine, albumen, or caseine.

The proportions of the several materials, by weight, are about as follows to produce a substance closely resembling in properties the tusk of an old elephant: caustic lime, (CaO,) one hundred parts; water, ($H_2O$,) three hundred parts; aqueous solution, phosphoric acid, specific gravity 1.05 to 1.07, ($H_3PO_4$,) seventy-five parts; carbonate of lime, ($CaCO_3$,) sixteen parts; magnesia, (MgO,) one to two parts; alumina, (precipitated or hydrated,) five parts; albumen, twenty parts; gelatine, fifteen parts. The mass formed of these is mixed until the component parts are thoroughly incorporated together, and the whole is thoroughly kneaded until it assumes a plastic condition of the consistency of stiff dough. In this state it is allowed to stand for a few hours, during which the continued action of the phosphoric acid upon the other materials converts the whole into a fine tenacious white insoluble and uninflammable body similar in its constituent parts to the natural ivory. The compound while still in a plastic state is placed into shapes or molds and removed to a slow-drying room, (heated to a temperature of about 60° to 70° Fahrenheit, or with a current of air passing through it,) where it remains one or two days until sufficiently desiccated. Care should be taken not to remove all traces of moisture at this stage. When desiccated, it may be taken from the drying-room and placed direct into molds of a suitably-constructed hydraulic or other press or may be first finely ground and then placed in the molds; but we prefer the former method.

The molds into which the substance is placed are constructed so that it may be subjected to a high temperature and a great pressure. The heat may be produced either by gas or steam acting upon the walls of the mold, the latter being what we prefer.

In the heated molds the dried substance is subjected to pressure in a hydraulic or other press amounting to one, two, or more tons per square inch, according to the density of the product to be obtained, and the pressure is maintained thereon from one to two hours, more or less, according to the quantity of material under operation. The greater the bulk of material the longer time must the pressure be applied. The heat and pressure may be varied according to the quality and density of the ivory required to be produced.

We find that blocks closely resembling in physical properties the tusks of an old elephant may be produced from the materials in the proportions hereinbefore stated by applying a heat of about 270° Fahrenheit with a pressure of two tons per square inch applied for about an hour. By altering the heat, pressure, or duration of pressure the density or specific gravity of the resultant product may be varied as may be desired to render it more adaptable or serviceable for particular purposes. The substance when taken from the molds should be allowed to mature and season for three or four weeks, when it may be cut, turned, and polished in the ordinary way.

We are aware that the product can be obtained without the application of heat during the compressing stage of the process by increasing the pressure or the duration of the pressure, or both, and other details of the process may be varied without departing from our invention, which is essentially to synthetically construct or manufacture ivory having the same properties, chemical and physical, as the natural tusks, with or without the addition of any foreign matter to render the product more adaptable for any special purpose.

While we prefer to use only the materials hereinbefore enumerated as producing a substance more nearly like natural ivory, we find that other materials may be added thereto, such as baryta as a substitute for or in addition to magnesia acetate; or carbonate of lead instead of or in addition to the carbonate of lime, to increase the specific gravity; oxide or sulphate of zinc to increase the bulk or as an adulterant, and cellulose and certain oils or gums—such as animi mastic, shellac, oil of turpentine, and castor-oil—to render the product more plastic or elastic, if so desired. When colors are to be imparted to the product, aniline, alizarine, logwood, Brazil wood, fustic, or madder extracts, or other well-known coloring agents—such as pigments—may be incorporated with the mass in the earlier stages of the process in such quantities or proportions as will give the required color or tint.

What we claim as our invention, and desire to secure by Letters Patent, is—

1. The process of manufacturing artificial ivory, which consists in adding an aqueous solution of phosphoric acid to lime, thereby forming phosphate of lime, mixing therewith finely-divided earthy mineral matters such as described, and gelatine and albumen, allowing it to mature, desiccating the mass, and subjecting it hot to great pressure, substantially as described.

2. The process of manufacturing artificial ivory, which consists in mixing in a wet state slaked lime, tricalcic phosphate, carbonate of lime, magnesia, and alumina, all in a state of fine comminution, with albumen and gelatine, drying, and submitting the same to great pressure while heated, substantially as described.

3. The improvement in the process of forming artificial ivory, which consists in slaking lime and before the operation is completed adding phosphoric acid, mixing the other ingredients therewith, and leaving the whole to stand and complete their reaction before proceeding, whereby a much more homogeneous mass is formed than would be the case if each reaction were allowed to take its course separately.

4. The process of manufacturing ivory synthetically, which consists in treating hydrate of lime with an aqueous solution of phosphoric acid to form phosphate of lime, mixing therewith carbonate of lime, magnesia, and alumina precipitate, gelatine, and albumen, desiccating the mass, and subjecting it to a great pressure until solidified.

In testimony whereof we have signed our names to this specification in the presence of two subscribing witnesses.

ALEXANDRE DE PONT.
SILVIUS DE PONT.

Witnesses:
WM. SWAINSON,
W. HENRY LORD.